US008587140B2

(12) United States Patent
Egedal et al.

(10) Patent No.: US 8,587,140 B2
(45) Date of Patent: Nov. 19, 2013

(54) ESTIMATING AN ACHIEVABLE POWER PRODUCTION OF A WIND TURBINE BY MEANS OF A NEURAL NETWORK

(75) Inventors: Per Egedal, Herning (DK); Andreas Groth Knudsen, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 588 days.

(21) Appl. No.: 12/620,904

(22) Filed: Nov. 18, 2009

(65) Prior Publication Data

US 2010/0127495 A1 May 27, 2010

(30) Foreign Application Priority Data

Nov. 26, 2008 (EP) ..................................... 08020579

(51) Int. Cl.
*H02P 9/00* (2006.01)
(52) U.S. Cl.
USPC ........................................... 290/44; 700/287
(58) Field of Classification Search
USPC ...................... 290/44; 700/287, 48
See application file for complete search history.

(56) References Cited

U.S. PATENT DOCUMENTS

| | | | | |
|---|---|---|---|---|
| 5,023,045 A * | 6/1991 | Watanabe et al. | ............. | 376/215 |
| 5,798,631 A * | 8/1998 | Spee et al. | ........................ | 322/25 |
| 6,975,925 B1 * | 12/2005 | Barnes et al. | ................. | 700/286 |
| 7,228,235 B2 | 6/2007 | Grzych et al. | | |
| 7,952,215 B2 * | 5/2011 | Hayashi et al. | ................. | 290/44 |
| 2002/0087234 A1 | 7/2002 | Lof et al. | | |
| 2010/0152905 A1 * | 6/2010 | Kusiak | .......................... | 700/276 |
| 2010/0305767 A1 * | 12/2010 | Bengtson | ...................... | 700/287 |
| 2011/0004356 A1 * | 1/2011 | Garcia | .......................... | 700/287 |

FOREIGN PATENT DOCUMENTS

GB 2405492 A 3/2005

OTHER PUBLICATIONS

K. Kaur et al: "Wind Generation System—A Comprehensive Survey Report", Universities Power Engineering Conference, IEEE, Piscataway, USA, Sep. 1, 2008, pp. 1-5, XP031349097.

* cited by examiner

*Primary Examiner* — Michael Zarroli

(57) ABSTRACT

A method for estimating an achievable power production of a wind turbine, which is operated with a reduced power set point is provided. The method includes determining the values of at least two parameters, inputting the values of the at least two parameters into a neural network, and outputting an output value from the neural network. The at least two parameters are indicative of an operating condition of the wind turbine. Thereby, the output value is an estimate of the achievable power production of the wind turbine. A control system which is adapted to carry out the described power estimation method is also provided. Furthermore, a wind turbine which uses the control system adapted to carry out the described power estimation method is provided.

17 Claims, 3 Drawing Sheets

ESTIMATING AN ACHIEVABLE POWER PRODUCTION OF A WIND TURBINE BY MEANS OF A NEURAL NETWORK

CROSS REFERENCE TO RELATED APPLICATIONS

This application claims priority of European Patent Office application No. 08020579.2 EP filed Nov. 26, 2008, which is incorporated by reference herein in its entirety.

FIELD OF INVENTION

The present invention relates to the field of wind turbines for generating electric power. In particular, the present invention relates to a method and to a control system for estimating an achievable power production of a wind turbine which is operated with a reduced power set point. Further, the present invention relates to a wind turbine and to a computer program for controlling the above mentioned power estimation method.

ART BACKGROUND

Wind energy is increasingly recognized as a viable option for complementing and even replacing other types of energy sources such as for instance fossil fuels. In the early development of wind energy, the majority of wind turbines were constructed for operation at a constant speed. However, recently the trend is toward using variable-speed wind turbines to better capture available wind power. In most cases, wind turbine blade pitch angles can be adjusted to control the operation of the variable speed wind turbine.

When the electrical power, which is fed into an electricity network, is larger than the electrical power, which is extracted from the electricity network, the frequency of the whole electricity network will increase. This is based on the fact that the wind turbines, which are connected to the electricity network, cannot deliver all their generated power to the electricity network. As a consequence, the frequency of the produced alternating current (AC) of the generated electrical power will increase. Typically, such a behavior will be shown not only by one wind turbine but by a plurality of wind turbines of a wind turbine park. Therefore, a power imbalance, wherein the produced power is larger than the user power, may result in an overall increase of the frequency of the electricity network.

In order to avoid such frequency variations it is known to operate wind turbines with a reduced power set point such that the electrical power, which is fed into the electricity network, will be reduced and a power balance between the power being delivered to the electricity network and the power being removed from the electricity network can be achieved at least approximately. Such a reduction of the power set point may even be requested by legal regulations in order to guarantee a stable electricity network.

The reason why a wind turbine is operated with a reduced power set point is typically not in the sphere of influence of the operator of the wind turbine. Therefore, the operator of a wind turbine will typically receive a revenue, which is related to the achievable power production and not to the actual power production. Therefore, it is highly desirable for an operator of a wind turbine to always have a precise and a reliable knowledge about the achievable power production of its wind turbine(s). Of course, the achievable power production will strongly depend on the actual wind condition.

It is known to estimate the achievable power production of a wind turbine by measuring the wind speed for instance at the top of the wind turbine nacelle and, based on the measured wind speed, to calculate the achievable power production. This known procedure for estimating the achievable power production has the disadvantage that the results are typically not very precise.

There may be need for improving the accurateness for estimating an achievable power production of a wind turbine which is operated with a reduced power set point.

SUMMARY OF THE INVENTION

This need may be met by the subject matter according to the independent claims. Advantageous embodiments of the present invention are described by the dependent claims.

According to a first aspect of the invention there is provided a method for estimating an achievable power production of a wind turbine which is operated with a reduced power set point. The provided method comprises (a) determining the values of at least two parameters being indicative for an operating condition of the wind turbine, (b) inputting the values of the at least two parameters into a neural network, and (c) outputting an output value from the neural network, wherein the output value is an estimate of the achievable power production of the wind turbine.

This first aspect of the invention is based on the idea that by using a neural network the computational power can be reduced significantly, which is necessary for calculating the achievable power production of a wind turbine being operated at a reduced set point. In other words, the estimation process can be carried out by a simple processing device having a comparatively small computational power. This may provide the advantage that such a simple processing device can be installed at every wind turbine being operated by an energy company without increasing the initial cost of the wind turbine. In particular, the simple processing device can be implemented within a control unit of a wind turbine, which is anyway used for controlling the operation of the respective wind turbine.

Using a reduced power set point for the wind turbine can be necessary for instance if the alternating current (AC) frequency of the provided electrical power gets too high. This can be the case for instance when the electrical power, which is fed into an electricity network by the wind turbine, is bigger than the electrical power, which is consumed for instance by the end-consumers, which are also connected to the electricity network. In other words, if the electrical power being fed into the electricity network is not used, the AC frequency of the electricity network will increase. Such a frequency increase can be avoided if at least one wind turbine being connected to the electricity net is operated with a reduced power set point such that a balance between (a) the electrical power being fed into the electricity network and (b) the electrical power being removed from the electricity network is maintained. Therefore, there are legal regulations which request the owner of a wind turbine to adapt the power set point of its wind turbine accordingly. However, since in such cases the reduction of the power set point is not in the sphere of influence of the operator of the wind turbine, the operator will receive a revenue, which is related to the achievable power production and not to the actual power production. Therefore, it is highly desirable for an operator of a wind turbine to always have a reliable knowledge about the achievable power production which would be possible with an optimal power set point. Of course, the achievable power production will strongly depend on the actual wind condition.

According to an embodiment of the invention the values of three parameters being indicative for an operating condition of the wind turbine are determined and inputted into the neural network. Thereby, a first parameter is the actual power production of the wind turbine, a second parameter is the pitch angle of the blades of the rotor of the wind turbine and the third parameter is the rotor speed. This may provide the advantage that based on the three input parameters actual power production, pitch angle and rotor speed a highly precise power estimation can be guaranteed. The high precision of the power estimation is based on the whole rotor plane and not simply on a single wind speed measurement which is used for known power estimation procedures.

According to a further embodiment of the invention the neural network is a neural network, which has been trained on measured data. This may provide the advantage that highly reliable experimental data can be used for training the neural network.

The experimental data may be obtained for instance by a variation of the blade pitch angle within a period of time, within which the wind conditions are not or only insignificantly changed. Thereby, the blade pitch angle may be changed from an optimal angle to a suboptimal angle leading to a reduced power production corresponding to a reduced power set point of the wind turbine. Of course, when altering the blade pitch angle a plurality of different reduced power productions can be determined, wherein each reduced power production corresponds to a suboptimal angle position and/or to a certain reduced power set point.

According to a further embodiment of the invention the neural network is a neural network, which has been trained on calculated data. The calculated date may be obtained in particular from elaborate computational calculations, which take into account the whole aerodynamic behaviour the wind turbine and in particular the aerodynamic behaviour the rotor of the wind turbine. Thereby, inter alia the size and the shape of the blades of the rotor may be taken into account.

According to a further embodiment of the invention the neural network comprises a plurality of network nodes, which are arranged in three layers of the neural network. Thereby, a first layer may be called input layer, a second layer may be called hidden layer and the third layer may be called output layer.

The described neural network structure having three layers may provide the advantage that the power estimation can be carried out with a rather simple structure, which allows for a fast training of the neural network. This means that the neural network may yield reasonable results for the power estimation process already after a few training sequences have been accomplished.

According to a further embodiment of the invention (a) all first network elements being assigned to a first layer of the neural network are connected to all second network elements being assigned to a second layer of the neural network and (b) all second network elements being assigned to the second layer of the neural network are connected to all third network elements being assigned to the third layer of the neural network. This may provide the advantage that the neural network exhibits a highly symmetric structure, which may further facilitate a training procedure of the neural network.

According to a further aspect of the invention there is provided a control system for estimating an achievable power production of a wind turbine which is operated with a reduced power set point. The provided control system comprises (a) a determination unit for determining the values of at least two parameters being indicative for an operating condition of the wind turbine, (b) a neural network, which is adapted to receive the values of the at least two parameters, and (c) an output unit for outputting an output value from the neural network, wherein the output value is an estimate of the achievable power production of the wind turbine.

This further aspect of the invention is based on the idea that the above mentioned method for estimating an achievable power production of a wind turbine being operated with a reduced power set point can be executed or controlled by the described control system, which can be easily implemented in a known wind turbine. Thereby, the known wind turbine can be easily converted into a new type of wind turbine, which may be adapted to carry out any embodiment of the above described method.

The described control system may be realized by means of a computer program respectively by means of software. However, the control system may also be realized by means of one or more specific electronic circuits respectively hardware. Furthermore, the control system may also be realized in a hybrid form, i.e. in a combination of software modules and hardware modules.

According to a further aspect of the invention there is provided a wind turbine for generating electric power. The provided wind turbine comprises (a) a rotor having at least one blade, wherein the rotor is rotatable around a rotational axis and the at least one blade extends radial with respect to the rotational axis, (b) a generator being mechanically coupled with the rotor, and (c) a control system as described above.

This further aspect of the invention is based on the idea that by embedding the above described control system into a usual wind turbine, the wind turbine can be provided with the functionality to carry out the above described method for estimating an achievable power production.

According to a further embodiment of the invention the wind turbine further comprises (a) a power sensor for measuring the actual power production of the wind turbine, (b) an angle sensor for measuring the blade pitch angle of the at least one blade, and (c) a rotational-speed sensor for measuring the actual rotational speed of the rotor. The power sensor, the angle sensor and the rotational-speed sensor are coupled to the control system. Further, the control system is adapted to estimate the achievable power production of the wind turbine based on the actual power production of the wind turbine, the blade pitch angle of the at least one blade and the rotational speed of the rotor.

As has already been mentioned above the usage of the three input parameters actual power production, pitch angle and rotor speed may provide the advantage that a highly precise power estimation can be guaranteed because the power estimation is based on the whole rotor plane and not simply on a single wind speed measurement. Such a single wind speed measurement is carried out in connection with known wind turbines at a certain spatial point of the known wind turbine for instance at the turbine nacelle top.

According to a further aspect of the invention there is provided a computer program for estimating an achievable power production of a wind turbine which is operated with a reduced power set point. The computer program, when being executed by a control system, is adapted for controlling the above described achievable power production method.

As used herein, reference to a computer program is intended to be equivalent to a reference to a program element and/or to a computer readable medium containing instructions for controlling a computer system to coordinate the performance of the above described method.

The computer program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the example of embodiment to be described hereinafter and are explained with reference to the example of embodiment. The invention will be described in more detail hereinafter with reference to an example of embodiment but to which the invention is not limited.

DETAILED DESCRIPTION

Figure 1:
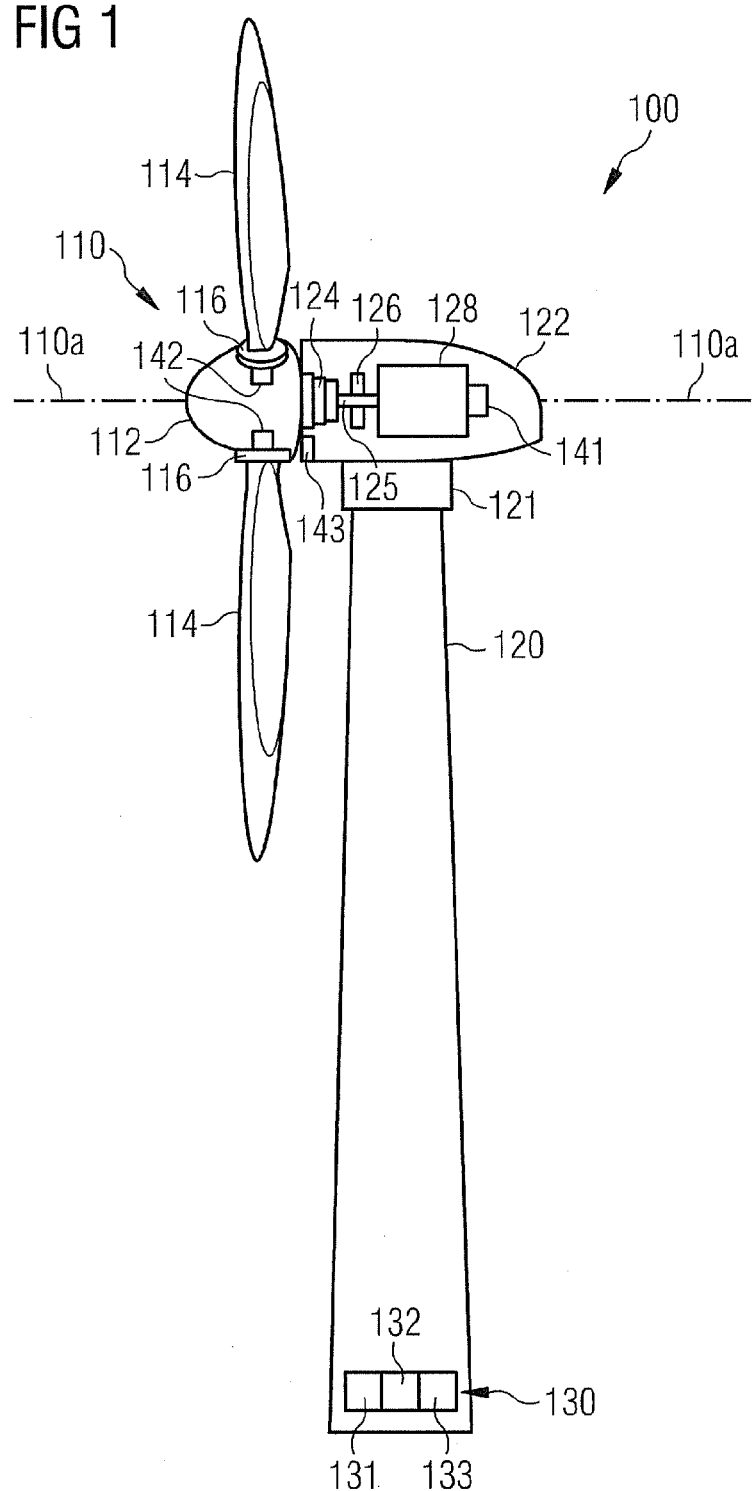
FIG. 1 shows a wind turbine comprising a control system for estimating the achievable power production of the wind turbine when the wind turbine is operated with a reduced power set point.

The illustration in the drawing is schematically. It is noted that in different figures, similar or identical elements are provided with the same reference signs or with reference signs, which are different from the corresponding reference signs only within the first digit.

The illustration in the drawing is schematically. It is noted that in different figures, similar or identical elements are provided with the same reference signs or with reference signs, which are different from the corresponding reference signs only within the first digit.

FIG. 1 shows a wind turbine 100 according to an embodiment of the invention. The wind turbine 100 comprises a mast 120, which is mounted on a non-depicted fundament. On top of the mast 120 there is arranged a housing 122. In between the mast 120 and the housing there is provided a rotor angle adjustment device 121, which is capable of rotating the housing 122 around a non depicted vertical axis, which is aligned with the longitudinal extension of the mast 120. By controlling the rotor angle adjustment device 121 in an appropriate manner it can be made sure, that during operation of the wind turbine 100 the housing 122 is always properly aligned with the current wind direction.

The wind turbine 100 further comprises a rotor 110 having three blades 114. In the perspective of FIG. 1 only two blades 114 are visible. The rotor 110 is rotatable around a rotational axis 110a. The blades 114, which are mounted at a driving collar 112, extend radial with respect to the rotational axis 110a.

In between the driving collar 112 and a blade 114 there is respectively provided a blade adjustment device 116 in order to adjust the blade pitch angle of each blade 114 by rotating the respective blade 114 around a non depicted axis being aligned parallel with the longitudinal extension of the blade 114. By controlling the blade adjustment device 116 the blade pitch angle of the respective blade 114 can be adjusted in such a manner, that depending on the current wind conditions a maximum wind power can be retrieved from the available wind power.

As can be seen from FIG. 1, within the housing there is provided a gear box 124 in order to convert the number of revolutions of the rotor 110 into a higher number of revolutions of a shaft 125, which is coupled in a known manner to a generator 128. Further, a brake 126 is provided in order to stop the operation of the wind turbine 100 for instance in case of an emergency and/or in case of strong wind conditions, which might harm the wind turbine 100.

The wind turbine 100 further comprises a control system 130 for operating the wind turbine 100 in a highly efficient manner. Apart from controlling for instance the rotor angle adjustment device 121 the depicted control system 130 is also used for adjusting the blade pitch angle of the rotor blades 114 in an optimized manner.

According to the embodiment described here the control system 130 is also used for estimating an achievable power production of the wind turbine 100 if the wind turbine 100 is operated with a reduced power set point. Therefore, the control system 130 comprises a determination unit 131 for determining the values of three parameters being indicative for the actual operating condition of the wind turbine 100.

A first parameter is the actual power production of the wind turbine 100. The determination unit 131 acquires the value of the first parameter from a power sensor 141, which, is connected to the generator 128. A second parameter is the blade pitch angle of the blade 114. The determination unit 131 acquires the value of the second parameter from angle sensors 142, which, according to the embodiment described here, are connected to the respective blade adjustment device 116. The third parameter is the rotational speed of the rotor 110. The determination unit 131 acquires the value of the third parameter from a rotational speed sensor 143, which is connected to the gear box 124.

The control system 130 further comprises a neural network 132, which is adapted to receive the values of the three parameters being indicative for the actual operating condition of the wind turbine 100 and which has been trained for estimating the achievable power production of the wind turbine 100 based on the values of the three parameters. Further, the control system 130 comprises an output unit 133 for outputting an output value from the neural network 132, wherein the output value represents the estimate of the achievable power production of the wind turbine 100.

Figure 2:
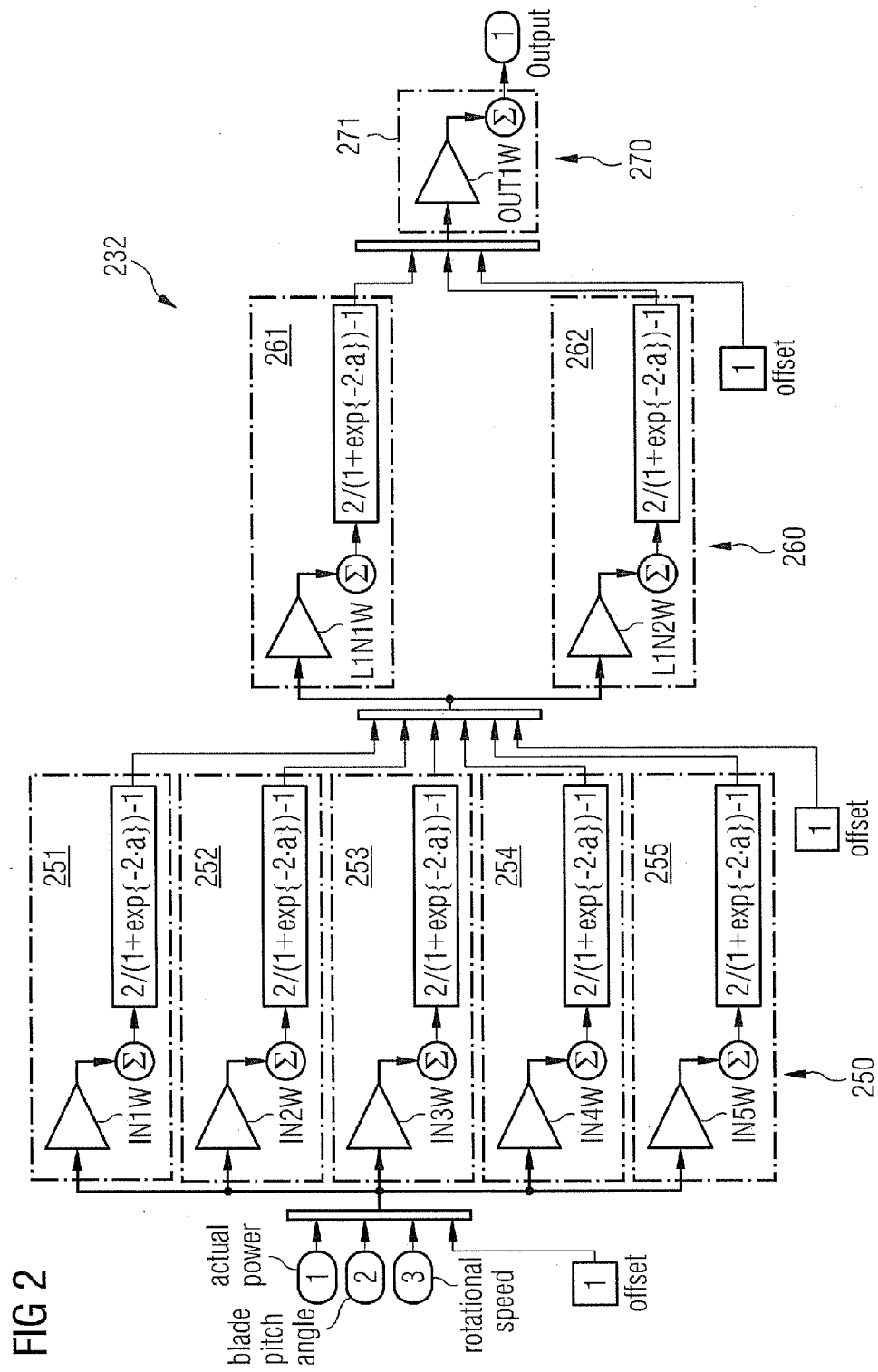
FIG. 2 shows a neural network, which is used for a control system for estimating the achievable power production of a wind turbine when the wind turbine is operated with a reduced power set point.

FIG. 2 shows a neural network 232, which is used for the control system 130 depicted in FIG. 1. According to the embodiment described here the neural network 232 comprises a plurality of network nodes, which are arranged in three layers of the neural network. Five input network nodes 251, 252, 253, 254 and 255 are assigned to a first layer 250, which is also called input layer. Two network nodes 261 and 262 are assigned to a second layer 260, which is also called hidden layer. An output node 271 represents the third layer 270, which is also called output layer.

As can be seen from FIG. 2, four input values are fed to each of the input network nodes 251-255. These four values include the actual power, the actual blade pitch angle, the actual rotational speed and offset value. In order to have a better scaling of the weights in the neural network 232, the value for the power may be divided by for instance 100 before being fed into the input layer 250 of the neural network 232.

According to the basic principles of neural networks, a weight factor INxW is assigned to each of the input network nodes 251-255. Thereby, the parameter "x" corresponds to input network node 25"x". As can be further seen from FIG. 2, each of the input network nodes 251-255 comprises an adder unit, which summarizes all individual inputs which have been fed to the respective input node 251-255. Thereby, a value "u" is obtained.

The value "u" represents an input for a transfer function $f_t$. The transfer function $f_t$ is indicative for the coupling strength between each of the network nodes 251-255 to each of the network nodes 261 and 262. According to the embodiment described here the following transfer $f_t$ function is used for all network nodes of the first layer 250:

$$f_t = \frac{2}{1 + \exp\{-2u\}} - 1$$

Figure 3:
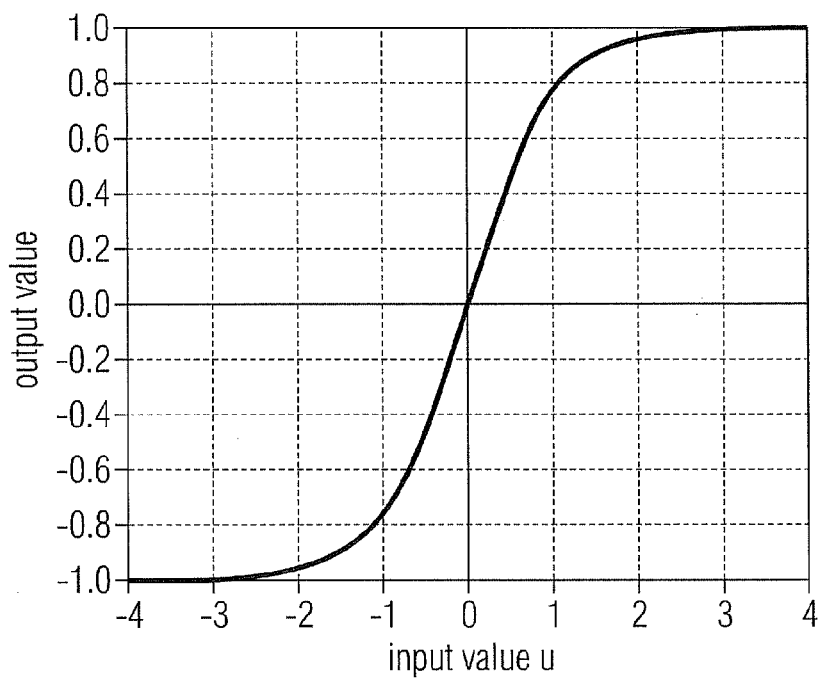
FIG. 3 shows a diagram depicting a transfer function for a neural network node of the neural network shown in FIG. 2.

FIG. 3 shows a diagram depicting the transfer function $f_t$ for the neural network nodes 251, 252, 253, 254 and 255.

As can be further seen from FIG. 2, the two network nodes 261 and 262 have the same structure as the network nodes 251-255. A weight factor L1N1W is assigned to the network node 261 and a weight factor L1N2W is assigned to the network node 262.

The output values of each one of the input network nodes 251-255 and the offset value, which has already been used for the input of the input network nodes 251-255, are fed both to the network node 261 and to the network node 262. After weighting all these values with the respective weight factor L1N1W or L1N2W, these values are summed up. For coupling the values respectively the output signals of the network nodes 261 and 262 to the output node 271, the same transfer function $f_t$ as described above is used.

The output values of each one of the network nodes 261, 262 and the offset value, which has already been used for the input of the input network nodes 251-255 and for the input of the network nodes 261 and 262, are fed to the output network node 271. After weighting all these values with the weight factor out1W, these values are summed up. The resulting summation value represents the output of the whole neural network 232. This output is the estimated achievable power production of the wind turbine when being operated with a reduced power set point.

It has to be mentioned that according to the principles of neural networks the weight factors IN1W, IN2W, IN3W, IN4W, IN5W, L1N1W, L1N2W and out1W are determined by means of training sequences. As a consequence, with each training procedure the values of the weight factors will improve.

It has to be further mentioned that the neural network 232 represents only one layout from a plurality of different layouts for possible neural networks. In particular, it is also possible for realizing the estimation of an achievable power production with only two or with three or more than three neural network layers. Further, it is not necessary that the structure of the neural network is symmetric. In particular, also a neural network may be used wherein not all outputs of the node being assigned to a particular layer are connected to all nodes being assigned to the neighbouring higher network layer. Also the number of network nodes, which are assigned to a certain network layer, may deviate from the embodiment described here.

Figure 4:
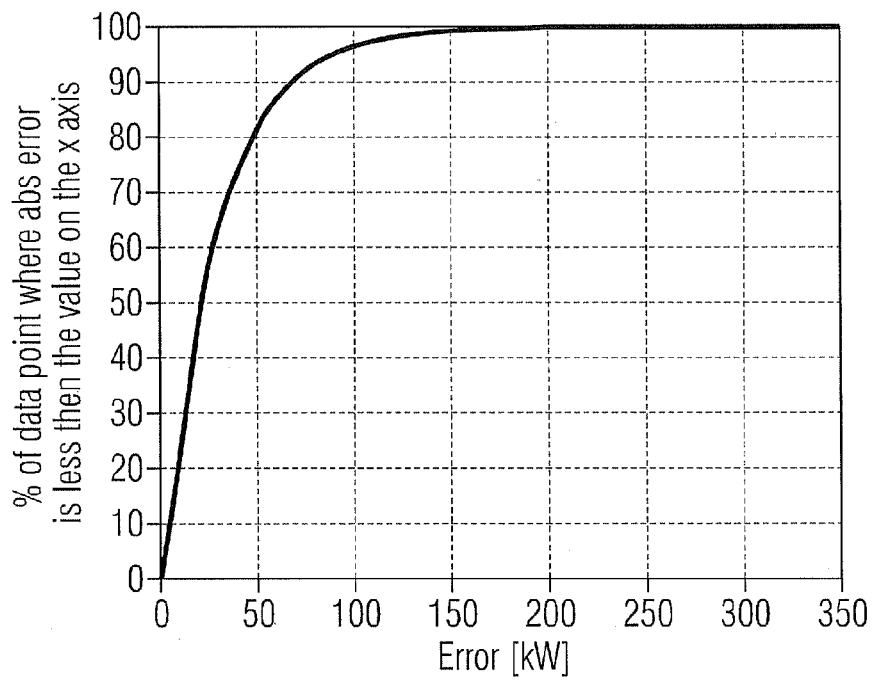
FIG. 4 shows a diagram depicting an error distribution for the neural network shown in FIG. 2 compared to a calculation of the achievable power production, wherein the calculation is based on a full aerodynamic model of a wind turbine.

FIG. 4 shows a diagram depicting an error distribution for the neural network 232 shown in FIG. 2 compared to a full aerodynamic calculation of the achievable power production. On the abscissa (x-axis) there is plotted the error of the estimated achievable power production in the unit kW. On the ordinate (y-axis) there is plotted the percentage of data points having an absolute error which is less than the respective value on the x-axis.

Thereby, the neural network 232 was trained with calculated data, which have been obtained by applying a full aerodynamic model of a wind turbine having a nominal power of 3600 kW. The error distribution shown in FIG. 4 comprises 870000 data points.

As can be seen from FIG. 4, the accuracy of the achievable power estimation relying on the neural network 232 is at least almost perfect when an error of 150 kW or more would be acceptable. Of course, the smaller the acceptable error is, the larger is the percentage of data points, which have an absolute error being larger than the acceptable error plotted on the abscissa.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for estimating an achievable power production of a wind turbine which is operated with a reduced power set point, the method comprising:
    determining values of three parameters, the three parameters are indicative of an operating condition of the wind turbine, wherein a first parameter is an actual power production of the wind turbine, a second parameter is a pitch angle of a plurality of rotor blades of the wind turbine, and a third parameter is rotor speed;
    inputting values of the three parameters into a neural network; and
    outputting an output value from the neural network, the output value is an estimate of the achievable power production of the wind turbine.

2. The method as claimed in claim 1, wherein the neural network has been trained on measured data.

3. The method as claimed in claim 1, wherein the neural network has been trained on calculated data.

4. The method as claimed in claim 1, wherein the neural network comprises a plurality of network nodes which are arranged in three layers.

5. The method as claimed in claim 4,
    wherein a plurality of first network elements are assigned to a first layer of the neural network and are connected to a plurality of second network elements that are assigned to a second layer of the neural network, and
    wherein the plurality of second network elements are connected to a plurality of third network elements which are assigned to a third layer of the neural network.

6. A control system for estimating an achievable power production of a wind turbine which is operated with a reduced power set point, the control system comprising:
- a determination unit for determining values of three parameters, the values of the three parameters are indicative of an operating condition of the wind turbine wherein a first parameter is an actual power production of the wind turbine, a second parameter is a pitch angle of a plurality of rotor blades of the wind turbine, and a third parameter is rotor speed;
- a neural network which is adapted to receive the values of the three parameters; and
- an output unit for outputting an output value from the neural network, the output value is an estimate of the achievable power production of the wind turbine.

7. The control system as claimed in claim 6, wherein the neural network has been trained on measured data.

8. The control system as claimed in claim 6, wherein the neural network has been trained on calculated data.

9. The control system as claimed in claim 6, wherein the neural network comprises a plurality of network nodes which are arranged in three layers.

10. The control system as claimed in claim 9,
wherein a plurality of first network elements are assigned to a first layer of the neural network and are connected to a plurality of second network elements that are assigned to a second layer of the neural network, and
wherein the plurality of second network elements are connected to a plurality of third network elements which are assigned to a third layer of the neural network.

11. The control system as claimed in claim 6, wherein the control system is realized using a computer program, an electronic circuit, or a combination of software and hardware modules.

12. A wind turbine for generating electric power, the wind turbine comprising:
- a rotor including a plurality of blades;
- a generator, mechanically coupled to the rotor; and
- a control system, comprising:
  - a determination unit for determining values of three parameters, the values of the three parameters are indicative of an operating condition of the wind turbine, wherein a first parameter is an actual power production of the wind turbine, a second parameter is a pitch angle of the plurality of rotor blades of the wind turbine, and a third parameter is rotor speed;
  - a neural network which is adapted to receive the values of the three parameters; and
  - an output unit for outputting an output value from the neural network, the output value is an estimate of an achievable power production of the wind turbine;
- wherein the rotor is rotatable around a rotational axis and the blades extend radially with respect to the rotational axis.

13. The wind turbine as claimed in claim 12, further comprising:
- a power sensor for measuring the actual power production of the wind turbine;
- an angle sensor for measuring pitch angle of the blade; and
- a rotational-speed sensor for measuring the speed of a rotor,
- wherein the power sensor, the angle sensor, and the rotational-speed sensor are coupled to the control system, and
- wherein the control system is adapted to estimate the achievable power production of the wind turbine based on the actual power production, the blade pitch angle, and the rotor speed.

14. The wind turbine as claimed in claim 12, wherein the neural network has been trained on measured data.

15. The wind turbine as claimed in claim 12, wherein the neural network has been trained on calculated data.

16. The wind turbine as claimed in claim 12, wherein the neural network comprises a plurality of network nodes which are arranged in three layers.

17. The wind turbine as claimed in claim 16,
wherein a plurality of first network elements are assigned to a first layer of the neural network and are connected to a plurality of second network elements that are assigned to a second layer of the neural network, and
wherein the plurality of second network elements are connected to a plurality of third network elements which are assigned to a third layer of the neural network.

* * * * *